(12) United States Patent
Lin et al.

(10) Patent No.: US 10,321,114 B2
(45) Date of Patent: Jun. 11, 2019

(54) TESTING 3D IMAGING SYSTEMS

(71) Applicant: Google LLC, Mountain View, CA (US)

(72) Inventors: Cheng-Yi Andrew Lin, Mountain View, CA (US); Honglei Wu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/228,909

(22) Filed: Aug. 4, 2016

(65) Prior Publication Data

US 2018/0041746 A1 Feb. 8, 2018

(51) Int. Cl.
*H04N 13/246* (2018.01)
*G01S 5/02* (2010.01)
(Continued)

(52) U.S. Cl.
CPC ........... *H04N 13/246* (2018.05); *G01S 5/021* (2013.01); *G01S 11/12* (2013.01); *G06T 7/80* (2017.01);
(Continued)

(58) Field of Classification Search
CPC ........................ H04N 13/0239; H04N 13/0055
(Continued)

(56) References Cited

U.S. PATENT DOCUMENTS 6,658,136 B1 * 12/2003 Brumitt .............. G06K 9/00362
382/103
8,401,242 B2  3/2013 Newcombe et al.
(Continued)

FOREIGN PATENT DOCUMENTS

CN   101040298 A   9/2007
CN   102317954 A   1/2012
(Continued)

OTHER PUBLICATIONS

International Search Report and Written Opinion issued in International Application No. PCT/US2017/043043, dated Oct. 20, 2017, 15 pages.
(Continued)

*Primary Examiner* — Jamie J Atala
*Assistant Examiner* — Kathleen V Nguyen
(74) *Attorney, Agent, or Firm* — Fish & Richardson P.C.

(57) ABSTRACT

Methods, systems, and apparatus, including computer programs encoded on a computer storage medium, relating to testing three-dimensional imaging systems. In some implementations, a system includes a mount for a three-dimensional camera, a mount for a calibration target, and a rail to which the mount for the calibration target is coupled. The movement of the mount for the calibration target is constrained to the direction extending along the rail. The system includes a processing device having logic that receives a reading from a particular three-dimensional camera coupled to the mount for the three-dimensional camera. The reading includes a distance from the three-dimensional camera to a particular calibration target coupled to the mount for the calibration target. The logic receives a measurement of an actual distance from the particular three-dimensional camera to the particular calibration target. The logic then provides measurement characteristics of the particular three-dimensional camera.

17 Claims, 5 Drawing Sheets

(51) Int. Cl.
  *G01S 11/12* (2006.01)
  *G06T 7/80* (2017.01)
(52) U.S. Cl.
  CPC .............. *G06T 2207/10012* (2013.01); *G06T 2207/10028* (2013.01); *G06T 2207/30204* (2013.01)
(58) Field of Classification Search
  USPC .......................................................... 348/46
  See application file for complete search history.

(56) References Cited

U.S. PATENT DOCUMENTS

| | | | |
|---|---|---|---|
| 8,866,889 B2 | 10/2014 | Masalkar et al. | |
| 2007/0075997 A1 | 4/2007 | Rohaly et al. | |
| 2010/0290909 A1* | 11/2010 | Greciet | F01D 25/285 416/153 |
| 2014/0267693 A1* | 9/2014 | Newman | G06T 7/0004 348/128 |
| 2014/0362184 A1* | 12/2014 | Jovanovski | G01S 17/89 348/46 |
| 2015/0049172 A1* | 2/2015 | Ramachandra | H04N 13/0239 348/47 |
| 2015/0302570 A1* | 10/2015 | Shirakyan | G06T 7/0051 348/46 |
| 2016/0073094 A1 | 3/2016 | Kang et al. | |
| 2016/0182903 A1* | 6/2016 | Grundhofer | G06T 7/80 348/187 |

FOREIGN PATENT DOCUMENTS

| | | |
|---|---|---|
| CN | 102317954 B | 9/2014 |
| CN | 105453136 A | 3/2016 |
| EP | 2451150 | 5/2012 |

OTHER PUBLICATIONS

Office Action issued in British Application No. 1712417.3, dated Feb. 5, 2018, 6 pages.
Written Opinion issued in International Application o. PCT/US2017/043043, dated Jun. 28, 2018, 6 pages.
International Preliminary Report on Patentability issued in International Application No. PCT/US2017/043043, dated Oct. 26, 2018, 18 pages.
CN Office Action issued in Chinese Application No. 201710661555.4, dated Jan. 23, 2019, 52 pages (with English translation).

* cited by examiner

TESTING 3D IMAGING SYSTEMS

FIELD

This specification relates to testing three-dimensional (3D) imaging systems.

BACKGROUND

Currently, there is no industry standard for benchmarking the performance of 3D imaging systems. Different 3D imaging systems can provide improved performance in various characteristics. 3D imaging systems are typically evaluated based on three metrics: noise and uniformity, sharpness and frequency response, and motion artifacts.

SUMMARY

Depth imaging systems, range imaging systems, or 3D imaging systems, produce 2D images showing the distance to points in an image from a specific point. The point is normally associated with a depth sensor or camera of the imaging system. The resulting images have pixel values that correspond to the distance. When a sensor of the system is properly calibrated, the pixel values can be given directly in physical units, such as meters.

According to one general implementation, 3D imaging systems can be tested and evaluated using a calibration set-up and calibration logic. The calibration set-up can include different calibration targets that allow a user to measure different characteristics of a particular 3D imaging system.

The calibration logic can be implemented by a measurement processor that applies the logic to subsequent measurements made by the 3D imaging system to output processed measurements. The processed measurements can include corrections for certain characteristics of the 3D imaging system based on the previously taken measurements.

In one general aspect, a system includes a mount for a three-dimensional camera, a mount for a calibration target, and a rail to which the mount for the calibration target is coupled. The movement of the mount for the calibration target is constrained to the direction extending along the rail. The system includes a processing device having logic that receives a reading from a particular three-dimensional camera coupled to the mount for the three-dimensional camera. The reading includes a distance from the three-dimensional camera to a particular calibration target coupled to the mount for the calibration target. The logic receives a measurement of an actual distance from the particular three-dimensional camera to the particular calibration target. The logic then provides measurement characteristics of the particular three-dimensional camera.

Implementations may include one or more of the following features. For example, the processing device may have logic further configured to receive a reading from the particular calibration target, such as receiving a distance reading from the particular three-dimensional camera to the particular calibration target from a laser rangefinder. The measurement characteristics can be scores that quantify a particular characteristic of the particular three-dimensional camera. The particular characteristics of the particular three-dimensional camera can include distance error. The particular characteristics of the particular three-dimensional camera can include sharpness or frequency response. The particular characteristics of the particular three-dimensional camera can include motion artifacts. The measurement characteristics can be transformations that produce a transform of a subsequent reading from the particular three-dimensional camera. The calibration target can be a uniformly flat surface. The calibration target can include tilted stepped targets. The calibration target can include a rotating propeller.

In another general aspect, a method performed by one or more computers includes receiving a reading from a particular three-dimensional camera coupled to the mount for the three-dimensional camera. The reading includes a distance from the three-dimensional camera to a particular calibration target coupled to the mount for the calibration target. The method includes receiving a measurement of an actual distance from the particular three-dimensional camera to the particular calibration target. The method further includes providing measurement characteristics of the particular three-dimensional camera.

Implementations may include one or more of the following features. For example, the method may further include receiving a reading from the particular calibration target. The measurement characteristics can be scores that quantify a particular characteristic of the particular three-dimensional camera. The measurement characteristics can be transformations that produce a transform of a subsequent reading from the particular three-dimensional camera. For example, the transformation characteristics can be a function applied to measurements taken by the particular three-dimensional camera to produce calibrated results. The function can correct for irregularities from ideal measurements.

In another general aspect, at least one computer-readable storage medium is encoded with executable instructions that, when executed by at least one processor, cause the at least one processor to perform operations including receiving a reading from a particular three-dimensional camera coupled to the mount for the three-dimensional camera. The reading includes a distance from the three-dimensional camera to a particular calibration target coupled to the mount for the calibration target. The operations include receiving a measurement of an actual distance from the particular three-dimensional camera to the particular calibration target. The operations further include providing measurement characteristics of the particular three-dimensional camera.

Implementations may include one or more of the following features. For example, the operations may further include receiving a reading from the particular calibration target. The measurement characteristics can be scores that quantify a particular characteristic of the particular three-dimensional camera. The measurement characteristics can be transformations that produce a transform of a subsequent reading from the particular three-dimensional camera. The operations may further include comparing the reading from the particular three-dimensional camera to an ideal measurement and determining, based on the comparing, measurement characteristics of the particular three-dimensional camera. The operations may further include determining, based on the measurement characteristics of the particular three-dimensional camera, a transformation, and applying the transformation to subsequent readings from the three-dimensional camera.

The details of one or more implementations are set forth in the accompanying drawings and the description, below. Other potential features and advantages of the disclosure will be apparent from the description and drawings, and from the claims.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
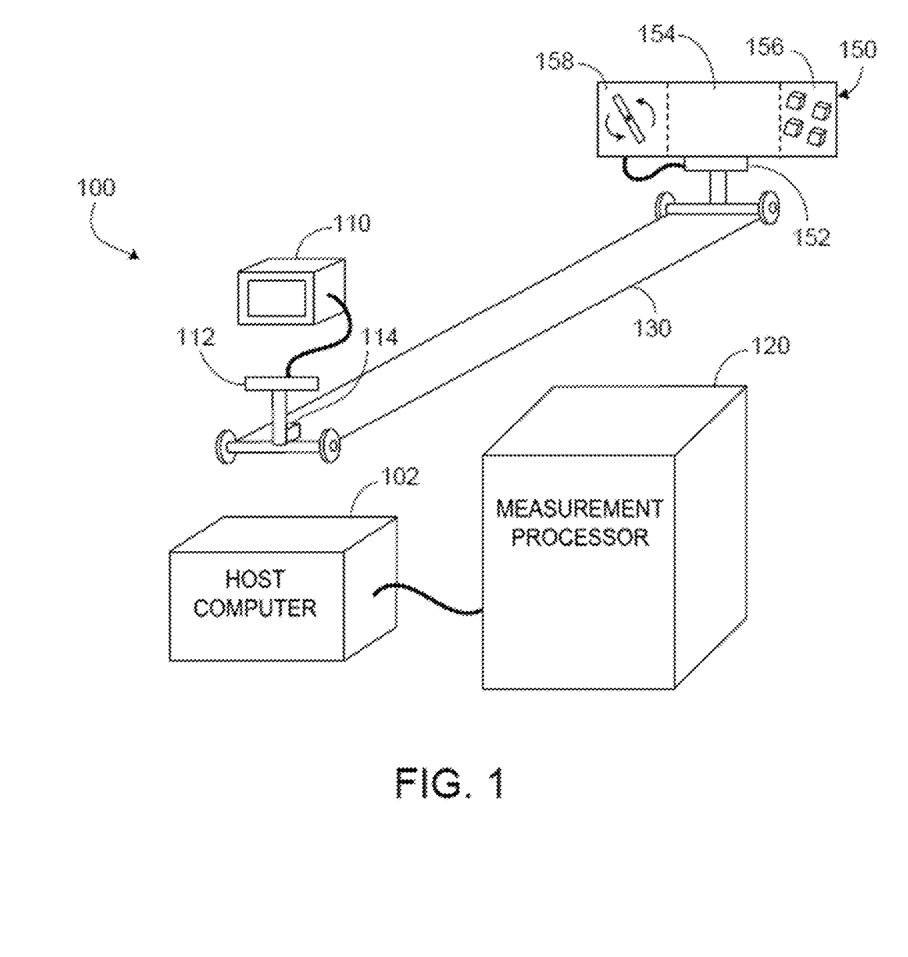
FIG. 1 illustrates an example system for testing a 3D imaging system.

FIG. 1 illustrates an example system for testing a 3D imaging system. Briefly, according to the illustrated example, a testing set-up includes a detachable mount for a 3D imaging system, a 3D imaging system, a calibration target, a detachable mount for a calibration target, a rail to which the mount for the 3D imaging system and the mount for the calibration target are coupled, a host computer that controls the position of the 3D imaging system and/or the calibration target, and a measurement processor that provides logic for testing and calibrating 3D systems. The 3D imaging system and/or the calibration target can be repositioned along the axis of the rail. The set-up can include a power and/or data cable from the 3D imaging system to the host computer. The set-up can also include a power and/or data cable from the calibration target to the mount for the calibration target or the host computer.

The 3D imaging system can capture 2D images with pixel values that indicate the distance from a particular point associated with the 3D imaging system to a particular point of the scene captured. The particular point can be the center of the sensor of the 3D imaging system. For example, pixel values of an image captured by a particular 3D imaging system can indicate a distance from the center of the sensor of the 3D imaging system to corresponding points on a face of a calibration target with varying depths.

With a properly calibrated 3D imaging system, the pixel values can be given in actual units of distance, such as inches, centimeters, feet, meters, and other units of distance. For example, pixel values of an image captured by a particular 3D imaging system can indicate a distance, in inches, from the center of the sensor of the 3D imaging system to corresponding points on a face of a calibration target with varying depths.

The 3D imaging system mount can include a range finder to measure actual target distance. The actual target distance can be used as an ideal value against which measurements taken by the 3D imaging system are compared.

The host computer can control the position of the 3D imaging system and/or the calibration target by moving the mount of the 3D imaging system and/or the mount of the calibration target, respectively, along the axis of the rail. For example, the host computer can control the position of the 3D imaging system to take measurements of the same calibration target with the 3D imaging system at different distances. In some examples, the host computer controls the position of both the 3D imaging system and the calibration target.

In further detail, varying the distances at which measurements are taken allows the measurement processor to determine characteristic means and variances for each pixel of the image taken by the 3D imaging system. Different calibration targets are used to measure different characteristics of 3D imaging systems.

For example, flat calibration targets with a uniform depth allow a user to measure noise and uniformity of depth measurements provided by the 3D imaging system. Titled stepped calibration targets with distinct edges allow a user to measure sharpness and frequency response of depth measurements provided by the 3D imaging system using a depth-edge spread function. Moving calibration targets with known angular velocities allow a user to measure motion artifacts of measurements provided by the 3D imaging system.

Flat targets allow measurement of distance accuracy and distance noise with variance. By varying the distance of the calibration target, measurements capture depth uniformity of a particular 3D imaging system. An ideal 3D imaging system's optical axis is perpendicular to a flat target plane. In practice, a 3D imaging system can never have perfect alignment. Corrections for irregularities from ideal measurements can be made using calibration logic applied by the measurement processor. In some examples, the measurement processor can fit a least squares best fit plane to depth map data taken by a particular 3D imaging system. The measurement processor can then subtract the best fit plane data from the depth map data. In some examples, the best fit plane data is subtracted from the depth map data taken after corrections are applied for certain characteristics of the 3D imaging system, such as field curvature. The resulting data provides the actual depth error over the entire sensor array of the 3D imaging system.

Depth uniformity characteristics can include fixed pattern noise (FPN), or a temporally constant lateral non-uniformity in an imaging system. FPN is characterized by a fixed pattern of high intensity and low intensity pixels in images taken under the same conditions.

Depth uniformity characteristics can also include field curvature. Field curvature can be characterized by a curvature of a flat object normal to the optical axis appearing curved. For example, field curvature in a depth image can present as distance readings lower than the actual distance at the edges of the depth image: the edges of a flat target can appear to curve toward the 3D imaging system. Field curvature can make an object appear curved in a convex or concave way.

Multiple measurements are taken to determine a distance mean and variance for each pixel. The number of measurements taken can be determined based on the number of measurements needed for a reasonable sample size. For example, a particular test of 3D imaging systems can include taking 64, 128, 256, 512, etc. measurements. The multiple measurements can be taken after correction is done for field curvature. For example, multiple measurements can be taken after the field curvature of a particular 3D imaging system is determined and accounted for in the calibration logic applied by the measurement processor to measurements taken by the 3D imaging system.

For example, if the 3D imaging system consistently provides depth readings at least 5% too low outside of a certain radius from the center of the focus of the 3D sensor, the calibration logic can increase depth readings outside of the radius by 5%. In some examples, the processed measurements can consistently provide measurements with negligible deviation from ideal measurements. In some examples, the processed measurements do not correct for all aberrations from ideal measurements.

Distance error can be measured by determining a difference between the mean measured distances (the mean of several observation values) of a 3D imaging system from the actual target distances. For example, the distance error of a particular 3D imaging system can be determined by subtracting the mean measured distances of the 3D imaging system from the actual target distances. This type of distance error is static error, and occurs with each measurement.

The 3D image system testing with flat calibration targets can include measuring the distance error of a 3D imaging system for different ambient light conditions. For example, a particular 3D imaging system can have limited distance accuracy in bright lighting situations, and measurements taken by the 3D imaging system can have a larger distance error in higher ambient light conditions. This type of distance error is temporal, and can depend on the conditions under which the measurements are taken.

Temporal noise includes errors that vary in time. For example, a 3D imaging system can be used to capture ten images of a flat target. For a given pixel, the distance error will have a static component and a temporal component. The static component comprises fixed-pattern noise (FPN) or field curvature (which is correctable), and is the same value for each of the ten images captured. The temporal component is the component of error that changes—it is different for each of the ten images that were captured.

Ideal conditions for taking measurements with a 3D imaging system include taking measurements in total darkness. The effect of ambient light has a large role in the amount of noise: typically, the higher the amount of ambient light, the noisier measurements will be.

The size of the calibration target used can be determined based on the maximum field of view (FOV) of the 3D imaging system and the maximum distance tested by the 3D imaging testing set-up. For example, the maximum dimension of a calibration target for a set-up could be calculated as shown in Equation 1, below:

$$\text{target dimension} = 2 \cdot \text{maximum distance} \cdot \tan(\text{FOV}°/2) \quad (1)$$

In some examples, the distance measurements taken at the minimum distance tested by the 3D imaging testing set-up are checked for saturated pixels. Saturated pixels present as a maximum value for the characteristic measured. For example, a saturated pixel can give an artificially high distance reading, such as infinity meters.

Tilted stepped targets with sharp edges allow measurement of sharpness and frequency response, as well as the depth edge-spread function of a 3D imaging system. The targets can be tilted any number of degrees. For example, a calibration target can include an array of square steps, each tilted about its center 5°. The width and depth of each target can be selected to be appropriate for the parameters of the set-up and the particular 3D imaging system being tested.

The depth edge spread function of a 3D imaging system can be determined by plotting detected distance against distance from the center of a tilted stepped target. For example, a plot of at least the pixels from an image taken by a 3D imaging system between a first line within an edge of a tilted stepped target and a second line outside of the edge of the tilted stepped target will include the depth spread function of the particular 3D imaging system that took the image.

Moving targets allow measurement of motion artifacts. For example, a calibration target can include a rotating flat propeller to capture spatial smear resulting from motion in a scene captured by a 3D imaging system. The width and length of the propeller can be determined based on the parameters of the testing set-up and the 3D imaging system being tested. The angular velocity of the moving target can be recorded and plotted against depth data taken by a 3D imaging system to create depth maps.

Motion artifacts can be measured using moving targets. Depth images can be captured at various angular velocities. For example, using a propeller rotating about its center, smear angles of a particular 3D imaging system can be recorded and plotted against angular velocities of the propeller along a circle of a specified diameter.

Alternative methods for measuring motion artifacts include the use of a flat target or tilted stepped targets. For example, a flat target can be used in a distance ramping: a host computer can automatically control the mount of the 3D imaging system along the rail of the set-up to ramp up the distance between the 3D imaging system and the target. A range finder that moves with the 3D imaging system can provide the actual distance, which is then plotted over time along with the measured distance by the 3D imaging system. The difference in the actual and measured distances can provide a distance error. In some examples, this distance error is not correlated with the smear measured in the previously described method of measuring motion artifacts. In some examples, the measurements taken are constrained by the velocity of the moving mount on the rail. In some examples, the actual and measured distances can be plotted against the velocity of the flat target. This method requires no additional targets or equipment in relation to the set-up for measuring distance accuracy.

A method for measuring motion artifacts using tilted stepped targets includes wiggling each target. For example, an array of tilted square steps can be used. Each square can be wiggled, e.g., horizontally or vertically, and smear along the edges of each target can be evaluated. The frequency of the wiggling of each target can be controlled.

Referring to FIG. 1, a system 100 for measuring characteristics of and calibrating 3D imaging systems includes a host computer 102 that controls the position of a 3D imaging system and/or a calibration target of a testing set-up for a 3D imaging system. The system 100 includes a 3D imaging system 110 that captures images with pixel values indicating distances between a point associated with the 3D imaging system 110 and an object.

The 3D imaging system 110 is detachably coupled to a 3D imaging system mount 112. The mount 112 is constrained to a rail 130. In this example, the mount 112 includes wheels that are constrained to move along the axis of the rail 130. In some examples, the mount 112 can be movably constrained to the rail 130 by other fasteners, such as Teflon sliders, bearings, etc.

The mount 112 can include a processor and/or power source, and can be coupled to the 3D imaging system 110 through one or more power and/or data cables. For example, a set of cables can connect the 3D imaging system 110 to the mount 112 and provide power to the 3D imaging system 110 while transferring data to and from the 3D imaging data. Data transferred through the cable or cables can include motion data. For example, the host computer 102 can control motion of the mount 112 and receive distance data from the 3D imaging system 110.

A range finder 114 is detachably coupled to the mount 112, and provides actual distance data between the 3D imaging system 110 and an object. The range finder 114 can be coupled to the mount 112 through one or more power and/or data cables similar to those described with reference to the 3D imaging system 110. For example, the host computer 102 can receive distance data from the range finder 114.

The system 100 includes a measurement processor 120 that applies calibration logic to measurements taken by the 3D imaging system 110. For example, calibration logic configured to correct field curvature of the 3D imaging system 110 using previously taken measurements can be stored on the measurement processor 120 and applied to subsequent measurements taken by the 3D imaging system 110.

The system 100 includes a calibration target assembly 150 that includes multiple types of calibration targets. The target assembly 150 is detachably coupled to a calibration target mount 152 similar to the coupling between the 3D imaging system 110 and the mount 112. The target assembly 150 can be connected to the mount 152 through one or more power and/or data cables.

The example target assembly 150 includes three types of calibration targets: a flat target 154, a tilted stepped target 156, and a moving target 158. The flat target 154 is a blank target with a uniform depth. The tilted stepped target 158 includes an array of tilted square steps, each sized and arranged based on the characteristics of the 3D imaging system 110.

The moving target 158 includes a rotating flat propeller. In some examples, a power cable connecting the target assembly 150 and the mount 152 provides power to the rotating flat propeller 158. In some examples, one or more data cables connecting the target assembly 150 and the mount 152 transfer data between the rotating flat propeller 158 and the mount 152 or the host computer 102. For example, the host computer 102 can control, monitor, and record the angular velocity of the rotating propeller 158.

Figure 2:
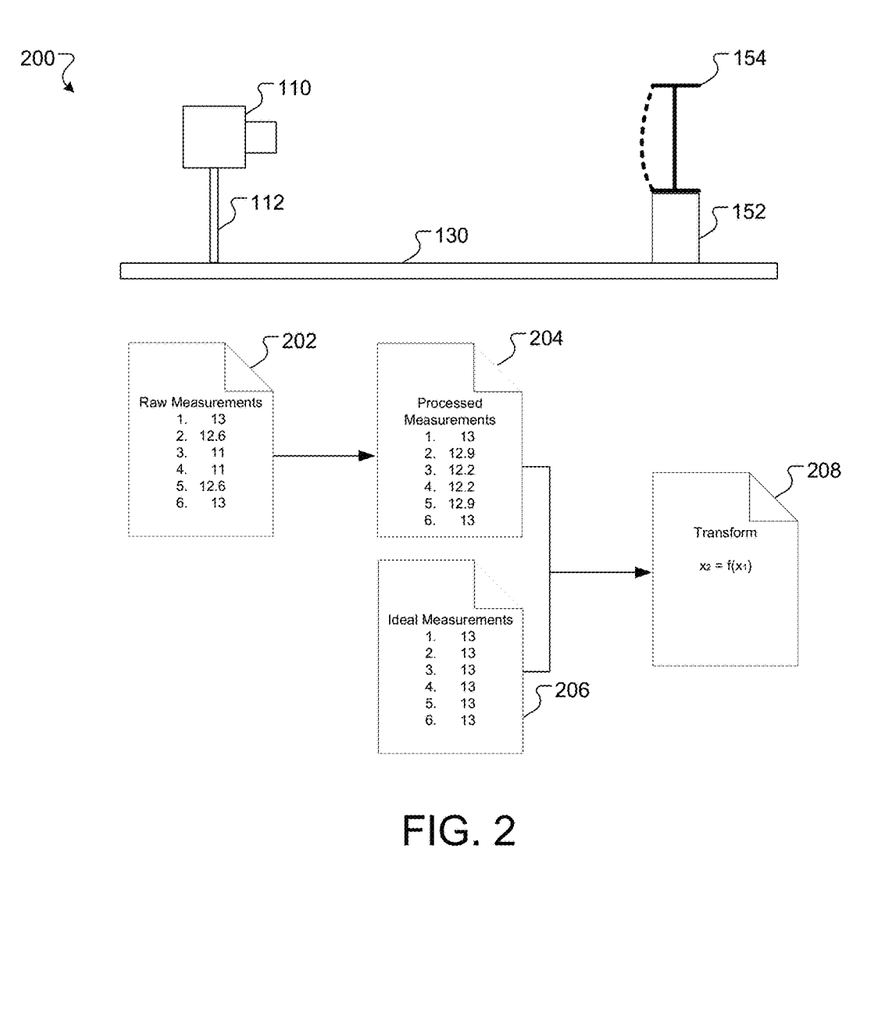
FIG. 2 illustrates an example system for testing a 3D imaging system by measuring the noise and uniformity of the imaging system.

FIG. 2 illustrates an example system 200 for testing a 3D imaging system by measuring the noise and uniformity of the imaging system. The system 200 represents a system that may be used to perform the testing and calibration described with respect to FIG. 1. Briefly, according to an example, depth measurements are taken using a 3D imaging system and the results are analyzed to calibrate subsequent measurements taken by the 3D imaging system. For example, depth images taken by a 3D imaging system can be analyzed for fixed-pattern noise and transient noise to determine an appropriate transformation for subsequent measurements taken by the 3D imaging system.

The system 200 includes the 3D imaging system 110 mounted on the 3D imaging system mount 112. The mount 112 is movably coupled to the rail 130, and allows the 3D imaging system to be repositioned along the rail 130 to provide depth measurements at different distances from the flat calibration target 154. The flat calibration target 154 is mounted on the calibration target mount 152.

The 3D imaging system 110 can collect raw measurements 202. The raw measurements 202 are depth measurements taken by the 3D imaging system 110, and have not been transformed or altered in any way. In this example, the flat calibration target 154 allows measurement of distance accuracy and distance noise with variance. By varying the distance of the calibration target 154, measurements capture depth uniformity of the 3D imaging system 110.

In this example, the raw measurements 202 show that distance measurements at the top and bottom of the flat calibration target 154 are larger than distance measurements toward the center of the flat calibration target 154. As illustrated by the dotted line, imperfections of the 3D imaging system 110 can produce depth measurements that make a flat object appear curved.

The raw measurements 202 can be processed by a measurement processor, such as the measurement processor 120 of FIG. 1. For example, it can be determined that depth measurements taken by the 3D imaging system 110 tend to be smaller than the actual depth at certain points. The measurement processor 120 can then compensate for this by processing measurements taken by the 3D imaging system 110 such that the measurements are increased. In some examples, the measurements can be increased by a fixed amount. In some examples, the noise in measurements taken by the 3D imaging system 110 is not fixed, and can change with distance between the 3D imaging system 110 and the flat calibration target 154. For example, the noise in measurements can increase as the distance between the 3D imaging system 110 and the flat calibration target increases.

The measurement processor 120 can produce processed measurements 204. For example, the depth measurements can be increased by a variable amount based on a distance between the 3D imaging system 110. The processing done by the measurement processor 120 can be done to measurements taken by the 3D imaging system 110 after initial measurements taken by the 3D imaging system 110 are analyzed to determine an amount of correction to apply.

Ideal measurements 206 represent the actual measurements of depth from the 3D imaging system 110 to the flat calibration target 154. In some examples, the ideal measurements 206 can be compared to the processed measurements 204 to determine a transform that produces further processed measurements. For example, the system 200 can combine and/or compare the processed measurements 204 to the ideal measurements 206 to produce a transform 208. In some examples, the transform 208 is applied to measurements taken by the 3D imaging system 110 to produce calibrated results. These corrections for irregularities from the ideal measurements 206 can be made using calibration logic applied by the measurement processor 120.

Figure 3:
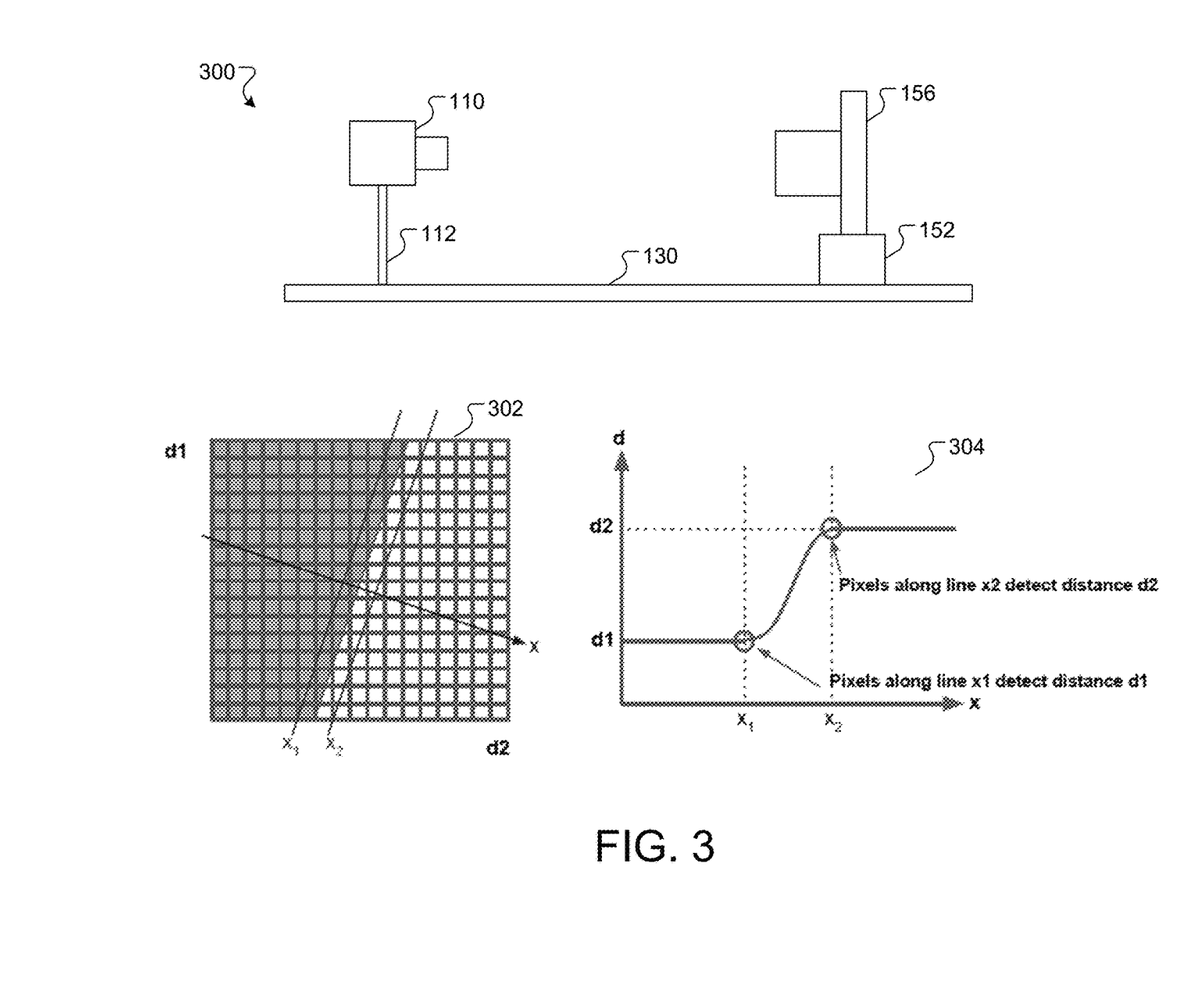
FIG. 3 illustrates an example system for testing a 3D imaging system by measuring the sharpness, or frequency response, of the imaging system.

FIG. 3 illustrates an example system 300 for testing a 3D imaging system by measuring the sharpness, or frequency response, of the imaging system. The system 300 represents a system that may be used to perform the testing and calibration described with respect to FIG. 1. Briefly, according to an example, depth measurements using tilted stepped targets are taken using a 3D imaging system and the results are analyzed to calibrate subsequent measurements taken by the 3D imaging system. For example, depth images taken by a 3D imaging system can be analyzed for sharpness and frequency response to determine an appropriate transformation for subsequent measurements taken by the 3D imaging system.

The system 300 includes the 3D imaging system 110 mounted on the 3D imaging system mount 112. The mount 112 is movably coupled to the rail 130, and allows the 3D imaging system to be repositioned along the rail 130 to provide depth measurements at different distances from the tilted stepped target 156. The tilted stepped target 156 is mounted on the calibration target mount 152.

The depth edge-spread can represent the sharpness and frequency response of a particular 3D imaging system. A particular configuration of calibration targets can allow for a depth edge-spread function of the 3D imaging system 110 to be measured. The transition from one depth to another depth is gradual and smooth; the level of blur provides an index by which the sharpness and frequency response of the 3D imaging system 110 can be measured. The slope of the edge-spread function can provide insight—if there is a small slope, there can be more blur.

For example, tilted square targets raised a uniform depth from a flat backing can allow sharpness of the 3D imaging system 110 to be measured. A depth image 302 of the tilted stepped target 156 can be analyzed and plotted as plot 304. Each pixel of the depth image 302 can have a depth value that corresponds to a point on the tilted stepped target 156. In this example, there are two actual depths: d1 and d2. d1 can be the depth of a target of the tilted stepped target 156. d2 can be the depth of a flat backing on which each target of the tilted stepped target 156 is mounted. A line, such as the line x, can be drawn through a perpendicular axis of the target shown in the depth image 302. Lines, such as lines x1 and x2, can be drawn on the inside and the outside, respectively, of the actual edge of the target shown in the depth image 302.

The plot 304 can have axes of distance along the line x and depth measurements. An ideal 3D imaging system produces a step function with a sharp jump between the depths d1 and d2. Real 3D imaging systems, such as the 3D imaging system 110 can produce the depth image 302 with pixels having depths with a continuous spread of values between the depth of the tilted stepped target 156 and the depth of the flat backing on which targets of the tilted stepped target 156 are mounted. The depth edge-spread of the 3D imaging system 110 can be represented by the function plotted in plot 304. The depth edge-spread function of the 3D imaging system 110 can be used to calibrate subsequent measurements taken by the 3D imaging system 110.

To calibrate subsequent measurements, signal dimensional fast Fourier transforms (FFTs) could be done to the signal to separate different frequency components of the transition. If the slope is abrupt, as it would be with an ideal camera, there would be frequency components at infinite frequency. Real cameras are not ideal, and signal processing can show that higher frequency components are suppressed. The level of suppression and the frequencies suppressed can be used as a measure of sharpness.

Figure 4:
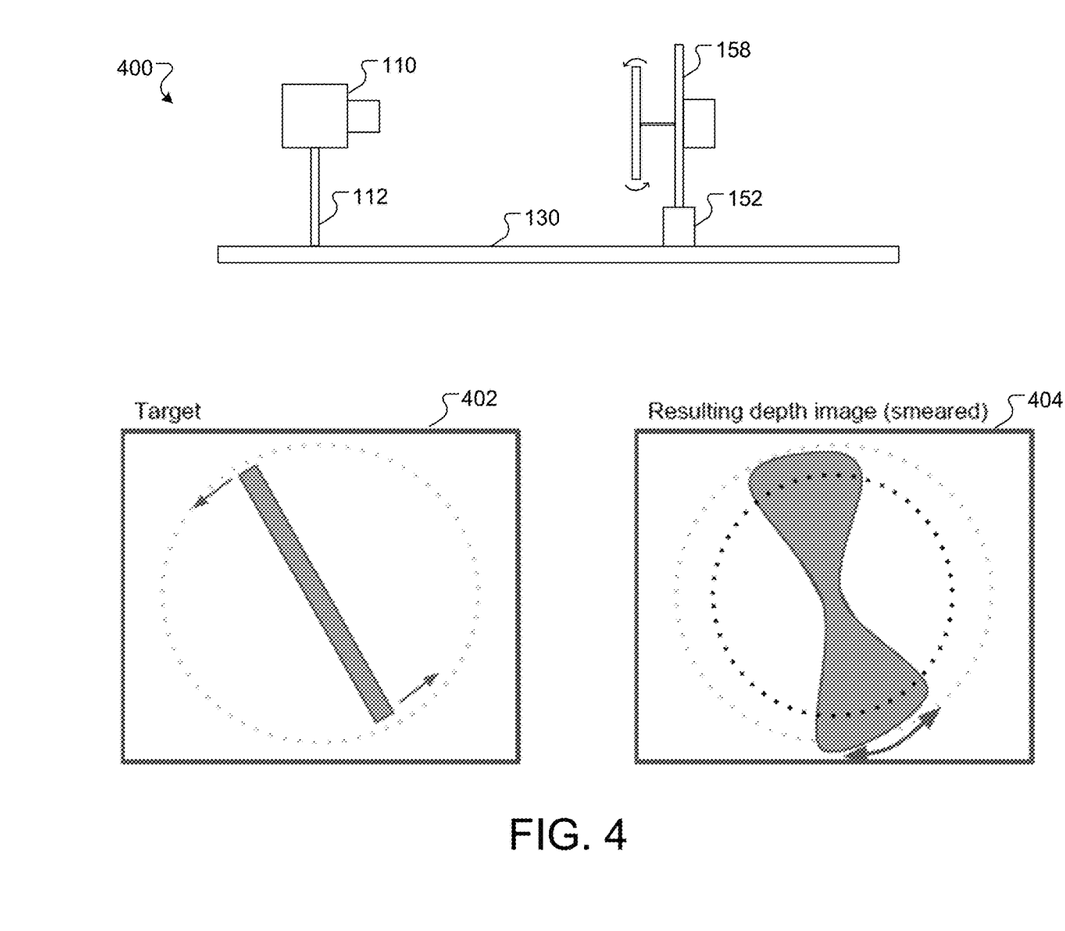
FIG. 4 illustrates an example system for testing a 3D imaging system by measuring motion artifacts of the imaging system.

FIG. 4 illustrates an example system 400 for testing a 3D imaging system by measuring motion artifacts of the imaging system. The system 400 represents a system that may be used to perform the testing and calibration described with respect to FIG. 1. Briefly, according to an example, depth maps as a function of angular velocity are taken using a 3D imaging system and the results are analyzed to calibrate subsequent measurements taken by the 3D imaging system. For example, phase images can be combined to produce depth maps that allow measurement of smear of a particular 3D imaging system 110.

The system 400 includes the 3D imaging system 110 mounted on the 3D imaging system mount 112. The mount 112 is movably coupled to the rail 130, and allows the 3D imaging system to be repositioned along the rail 130 to provide depth measurements at different distances from the moving calibration target 158. The moving target 158 is mounted on the calibration target mount 152.

Depending on the construction of a particular 3D imaging system, there will be different types of motion artifacts. When a depth camera captures a moving edge, there can be smear. For example, for 4-phase time-of-flight depth cameras, four phase images that are sequentially captured can be combined to form a depth image. If there is a moving edge, the resulting depth image can contain smear around that edge. The smear can be used to determine a distance calculating algorithm used by the 3D imaging system: different motion artifacts are produced through different algorithms used.

There are two general ways of collecting motion depth data: temporal and spatial. In temporal, or time-of-flight depth images, multiple measurements are taken at the same point at different times and calculations are done on each of the measurements. In spatial measurement, multiple points located in close proximity are measured at the same time and the measurements are combined to produce one final measurement.

A front view of the moving target 402 shows the rotating motion. Composite depth images can be captured using the 3D imaging system 110 at various angular velocities of the moving target 158. An example composite depth image 404 shows the smear of the 3D imaging system 110. In this example, the 3D imaging system 110 uses spatial measurement of motion depth data. For example, the depth image 404 allows measurement of smear angle, which can be plotted against angular velocity of the moving target 158 along a circle of a specified diameter, as shown by the dotted lines. In this example, the moving target 158 is a rotating target; smear can occur on both leading and trailing edges as they are both moving edges.

Calibration of measurements taken by a particular 3D imaging system can be done by a measurement processor separately from the testing and data collection. For example, the measurement processor 120 can analyze data provided to determine a transform, calculate compensation values, etc. for the particular 3D imaging system without receiving the measurements directly from the 3D imaging system. In some examples, the set-up of a testing system, such as the system 100, and the collection of data from the 3D imaging system 110 can be performed separately and the data subsequently provided to the measurement processor 120.

The lighting of a testing set-up can greatly affect the measurements taken by a 3D imaging system, making it difficult to standardize procedures for collecting data. In some examples, side illumination of calibration targets can be used. Additionally, factors such as the reflectivity and material composition of calibration targets affect the measurements taken and subsequent calibration to be applied to measurements taken by the particular 3D imaging system.

Figure 5:
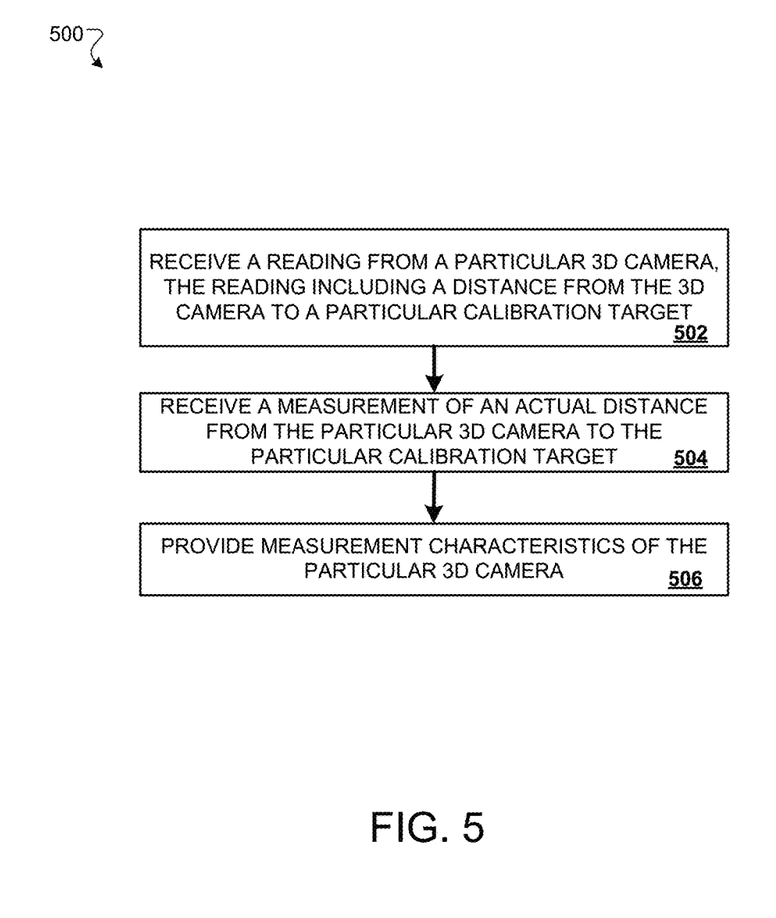
FIG. 5 is a flowchart illustrating an example process that characterizes the performance of a 3D imaging system.

FIG. 5 is a flowchart illustrating an example process 500 that characterizes the performance of a 3D imaging system. Briefly, according to an example, the process 500 includes receiving a reading from a particular 3D camera, the reading including a distance from the 3D camera to a particular calibration target (502). For example, depth measurements taken of the calibration target assembly 150 by the 3D imaging system 110 can be collected and sent to the measurement processor 120. The process 500 includes receiving a measurement of an actual distance from the particular 3D camera to the particular calibration target (504). For example, distance measurements taken from the range finder 114 of features of the calibration target assembly 150 can be sent to the measurement processor 120. The process 500 concludes by providing measurement characteristics of the particular 3D camera (506). For example, measurement characteristics of the particular 3D imaging system can include scores quantifying the camera's performance in specific area, such as distance accuracy, noise, sharpness, frequency response, motion artifacts, etc. In some examples, measurement characteristics include transforms or compensations to measurements taken by the particular camera to more closely align the measurements with ideal measurements.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system comprising:
a mount for a three-dimensional camera that is configured to capture two-dimensional images with pixel values that indicate a distance from the three-dimensional camera to a point of a captured scene;
a mount for a calibration target that includes a spinning propeller region;
a rail to which the mount for the calibration target is coupled, wherein the movement of the mount for the calibration target is constrained to a direction extending along the rail;
one or more computers that are configured to:
control the mount for the calibration target to automatically move to multiple testing positions along the rail;
receive, for each of the multiple testing positions that the calibration target is automatically moved along the rail, a reading from a particular three-dimensional camera coupled to the mount for the three-dimensional camera, the reading including a distance from the three-dimensional camera to a particular calibration target coupled to the mount for the calibration target;
receive, for each of the multiple testing positions that the calibration target is automatically moved along the rail, a measurement of an actual distance from the particular three-dimensional camera to the particular calibration target;
determine measurement characteristics of the particular three-dimensional camera, including a distance mean and a variance for each pixel at each of the multiple testing positions that the calibration target is automatically moved along the rail, based on (i) the readings from the particular three-dimensional camera for each of the multiple testing positions along the rail, and (ii) the measurements of the actual distance for each of the multiple testing positions along the rail, the measurement characteristics comprising:
motion artifacts that are calculated using the spinning propeller region of the particular calibration target;
provide the distance mean and the variance for the particular three-dimensional camera that are determined for each pixel at each of the multiple testing positions that the calibration target is automatically moved along the rail for production of results through correction of irregularities from ideal measurements, and correct, using signal processing and using the provided distance mean and the variance for the particular three-dimensional camera that are determined for each pixel at each of the multiple testing positions that the calibration target is automatically moved along the rail, for the irregularities from the ideal measurement characteristics in measurements that are subsequently obtained from the particular three-dimensional camera.

2. The system of claim 1, the processing device having logic further configured to receive distance data from the particular calibration target.

3. The system of claim 1, wherein the measurement characteristics are scores that quantify a particular characteristic of the particular three-dimensional camera.

4. The system of claim 3, wherein the particular characteristics of the particular three-dimensional camera comprise distance error that is calculated using a uniformly flat region of the particular calibration target.

5. The system of claim 3, wherein the particular characteristics of the particular three-dimensional camera comprise sharpness or frequency response that is calculated using a tilted, stepped region of the particular calibration target.

6. The system of claim 1, wherein the measurement characteristics are transformations that (i) produce a transform of a subsequent reading from the particular three-dimensional camera, and (ii) are generated based on the readings and measurements for each of the multiple testing positions along the rail.

7. The system of claim 1, wherein the particular calibration target is a uniformly flat surface.

8. The system of claim 1,
wherein determining the measurement characteristics comprises:
generating a depth map as a function of angular velocity; and
measuring characteristics of one or more motion artifacts based on the depth map; and
wherein correcting for the irregularities from the ideal measurement characteristics in measurements that are subsequently obtained from the particular three-dimensional camera comprises determining a distance of an object imaged using the three-dimensional camera based at least in part on the characteristics of the one or more motion artifacts.

9. A method comprising:
controlling a mount for a calibration target that includes a spinning propeller region to automatically move to multiple testing positions along a rail;
receiving, for each of the multiple testing positions along the rail, a reading from a particular three-dimensional camera that is configured to capture two-dimensional images with pixel values that indicate a distance from the three-dimensional camera to a point of a captured scene that includes the calibration target, and that is coupled to a mount for the three-dimensional camera, the reading including a distance from the three-dimensional camera to a particular calibration target coupled to the mount for the calibration target;
receiving, for each of the multiple testing positions that the calibration target is automatically moved along the rail, a measurement of an actual distance from the particular three-dimensional camera to the particular calibration target;
determining measurement characteristics of the particular three-dimensional camera, including a distance mean and a variance for each pixel at each of the multiple testing positions that the calibration target is automatically moved along the rail, based on (i) the readings from the particular three-dimensional camera for each of the multiple testing positions along the rail, and (ii) the measurements of the actual distance for each of the multiple testing positions along the rail, the measurement characteristics comprising:

motion artifacts that are calculated using the spinning propeller region of the particular calibration target;

providing the distance mean and the variance for the particular three-dimensional camera that are determined for each pixel at each of the multiple testing positions that the calibration target is automatically moved along the rail for production of results through correction of irregularities from ideal measurements; and correcting, using signal processing and using the provided distance mean and the variance for the particular three-dimensional camera that are determined for each pixel at each of the multiple testing positions that the calibration target is automatically moved along the rail, for the irregularities from the ideal measurement characteristics in measurements that are subsequently obtained from the particular three-dimensional camera.

10. The method of claim 9, further comprising receiving distance data from the particular calibration target.

11. The method of claim 9, wherein the measurement characteristics are scores that quantify a particular characteristic of the particular three-dimensional camera.

12. The method of claim 9, wherein the measurement characteristics are transformations that (i) produce a transform of a subsequent reading from the particular three-dimensional camera, and (ii) are generated based on the readings and measurements for each of the multiple testing positions along the rail.

13. At least one non-transitory computer-readable storage medium encoded with executable instructions that, when executed by at least one processor, cause the at least one processor to perform operations comprising:

controlling a mount for a calibration target that includes a spinning propeller region to automatically move to multiple testing positions along a rail;

receiving, for each of the multiple testing positions along the rail, a reading from a particular three-dimensional camera that is configured to capture two-dimensional images with pixel values that indicate a distance from the three-dimensional camera to a point of a captured scene that includes the calibration target, and that is coupled to a mount for the three-dimensional camera, the reading including a distance from the three-dimensional camera to a particular calibration target coupled to the mount for the calibration target;

receiving, for each of the multiple testing positions that the calibration target is automatically moved along the rail, a measurement of an actual distance from the particular three-dimensional camera to the particular calibration target;

determining measurement characteristics of the particular three-dimensional camera, including a distance mean and a variance for each pixel at each of the multiple testing positions that the calibration target is automatically moved along the rail, based on (i) the readings from the particular three-dimensional camera for each of the multiple testing positions along the rail, and (ii) the measurements of the actual distance for each of the multiple testing positions along the rail, the measurement characteristics comprising:

motion artifacts that are calculated using the spinning propeller region of the particular calibration target;

providing the distance mean and the variance for the particular three-dimensional camera that are determined for each pixel at each of the multiple testing positions that the calibration target is automatically moved along the rail for production of results through correction of irregularities from ideal measurements; and correcting, using signal processing and using the provided distance mean and the variance for the particular three-dimensional camera that are determined for each pixel at each of the multiple testing positions that the calibration target is automatically moved along the rail, for the irregularities from the ideal measurement characteristics in measurements that are subsequently obtained from the particular three-dimensional camera.

14. The computer-readable storage medium of claim 13, the operations further comprising receiving distance data from the particular calibration target.

15. The computer-readable storage medium of claim 13, wherein the measurement characteristics are scores that quantify a particular characteristic of the particular three-dimensional camera.

16. The computer-readable storage medium of claim 13, wherein the measurement characteristics are transformations that (i) produce a transform of a subsequent reading from the particular three-dimensional camera, and (ii) are generated based on the readings and measurements for each of the multiple testing positions along the rail.

17. The computer-readable storage medium of claim 13, the operations further comprising:

determining, based on the measurement characteristics of the particular three-dimensional camera, a transformation; and applying the transformation to subsequent readings from the three-dimensional camera.

* * * * *